(12) United States Patent
Canady et al.

(10) Patent No.: US 10,313,282 B1
(45) Date of Patent: Jun. 4, 2019

(54) FLEXIBLE MIDDLEWARE MESSAGING SYSTEM

(71) Applicant: Sprint Communications Company L.P., Overland Park, KS (US)

(72) Inventors: Nathan D. Canady, Overland Park, KS (US); Anthony E. Johnson, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 275 days.

(21) Appl. No.: 15/299,440

(22) Filed: Oct. 20, 2016

(51) Int. Cl.
*G06F 15/16* (2006.01)
*H04L 12/58* (2006.01)
*H04L 29/08* (2006.01)
*H04L 12/24* (2006.01)

(52) U.S. Cl.
CPC ........ *H04L 51/046* (2013.01); *H04L 41/0813* (2013.01); *H04L 67/02* (2013.01)

(58) Field of Classification Search
CPC .... H04L 51/046; H04L 41/0813; H04L 67/02
USPC ............ 709/206, 207, 224, 232, 248; 714/1, 714/4.11, 10, 13
See application file for complete search history.

(56) References Cited

U.S. PATENT DOCUMENTS

| | | | |
|---|---|---|---|
| 2007/0078995 A1* | 4/2007 | Benard | G06F 9/542 709/230 |
| 2013/0086199 A1* | 4/2013 | Frank | G06F 9/546 709/213 |

* cited by examiner

*Primary Examiner* — Farzana B Huq (57) ABSTRACT

A middleware messaging system hosted on a telecommunications network computer system is configured to route messages between a message queue (MQ) messaging system of a customer information system (CIS) and a point-to-point messaging system of a service control point management system (SCPMS). The middleware messaging system includes configurable components comprising a plurality of service delivery platform (SDP) consumers and SDP producers, where a status of the configuration components is dynamically changed by at least one of a configuration file, table entries in a database, or a management web page, and where the middleware messaging system is configured to receive a failover message from the backup node indicating a second instance of the telecommunication application is hosted on the backup node; determine messages pending a response from the first instance of the telecommunication application; and transmit the messages to the second instance of the telecommunication application.

16 Claims, 5 Drawing Sheets

FLEXIBLE MIDDLEWARE MESSAGING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Brokering messages between various systems is a key aspect of daily operations for a telecommunications network service provider. Various systems include both systems internal to the telecommunications network service provider as well as systems external to the service provider. Additionally, the various systems may be of varying types, for example Mainframe, HPE® NonStop platform (formerly Tandem), Linux based machines, Unix based machines, etc.

Challenges that service providers may face include ensuring a message from one system using one type of system architecture is successfully transmitted to an endpoint in another system that may use a different architecture. For example, the service provider may receive messages from a front-end client (e.g., a salesperson helping a customer) to open a new client account or to access an account of a current client where the messages are subsequently communicated to various systems within the service provider as well as the systems external to the service provider. In particular, the various internal and external systems may have interfaces that have evolved over time; thus upgrades to a middleware system configured to route messages between all the various systems would be beneficial.

SUMMARY

In an embodiment, a middleware messaging system hosted on a telecommunications network computer system is configured to route messages between a message queue (MQ) messaging system of a customer information system (CIS) and a point-to-point messaging system of a service control point management system (SCPMS). The middleware messaging system comprises configurable components including executable software for a plurality of SDP consumers and a plurality of SDP producers, wherein a status of the configurable components is dynamically changed by a configuration file, by entries in a database, or by a management web page. The SDP consumer communicatively couples an MQ farm and a set of SDP producers of the plurality of SDP producers. The middleware messaging system is configured to transmit, by way of the configurable components, messages between the CIS and SCPMS, where a first instance of the telecommunication application is hosted on a first node of the SCPMS. The SCPMS further includes a backup node.

The middleware messaging system is further configured to receive, by the SDP producer corresponding to the backup node, a failover message from the backup node indicating a second instance of the telecommunication application is hosted on the backup node. The middleware messaging system is further configured to determine messages pending a response from the first instance of the telecommunication application hosted on the first node; transmit the messages to the second instance of the telecommunication application; and release a connection to the first instance of the telecommunication application hosted on the first node In other embodiments, a service delivery platform (SDP) defined within a telecommunication network computer system provides a new interface while maintaining backwards compatibility with an external telecommunication network platform. The SDP includes a message database; and a middleware messaging system. The middleware messaging system includes configurable components including executable software for a plurality of SDP consumers and a plurality of SDP producers. The configurable components communicatively couple a message queue (MQ) farm and an MQ queue of the external telecommunication network platform.

The middleware messaging system is configured to parse messages retrieved from the MQ farm and to selectively deliver messages to a destination including one of: the MQ queue or a table inside the message database, based on the parsing of the messages. Selectively deliver messages further includes: retrieve, by an SDP consumer, a first message from the MQ farm, the first message including identifier information; identify, by the SDP consumer, a route of the first message based on the identifier information and a routing table stored in the middleware messaging system; and transmit the message, based on the identified route, to one of the MQ queue or the table inside the message database.

Additional embodiments include a method of brokering messages between a message queue system of a customer information system (CIS) and a point-to-point messaging system of a service control point management system (SCPMS) including: on a service delivery platform (SDP): dynamically creating service delivery platform (SDP) consumers by way of a configuration file; and dynamically creating SDP producers by way of the configuration file, the SDP consumers and SDP producers including executable software. The method also includes: on the service delivery platform: receiving, by an SDP consumer of the SDP consumers, a message in a message queue (MQ) format from the CIS; determining, by the SDP consumer, a destination application based on header information in the message; and transmitting, based on a location of the destination application, the message to at least one of: a database located on the SDP or the SCPMS in an MQ format.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A middleware messaging system hosted on a telecommunication network computer system may benefit from upgrades as external and internal systems connected to the middleware messaging system continue to evolve. As an example, external systems that the telecommunication network computer system may be connected to include the customer information system (CIS) and the Service Control Point Management System (SCPMS). In various embodiments, the CIS and SCPMS may host various applications that may communicate with each other. Accordingly, the middleware messaging system may transmit messages between the CIS and the SCPMS to facilitate communication between the different applications and processes running on the CIS and SCPMS.

A middleware messaging system may face various challenges when brokering messages between different platforms. In the context of CIS and SCPMS, some of those challenges may include tying a point-to-point messaging system with a message queue based messaging system. In some embodiments, the CIS may use a message queue (MQ) messaging system while the SCPMS may use a different messaging system such as a point-to-point messaging system. Thus, it may be beneficial for the middleware messaging system to have the capability to transmit messages between the two systems that are utilizing different messaging systems. Accordingly, structures provided to the middleware messaging system as discussed herein may address the challenge of tying together platforms using different messaging systems.

Some of the structure may include configurable components that are dynamically adaptable, without requiring a restart to the middleware messaging system. For example, to coordinate messages between the CIS and SCPMS, the upgraded middleware messaging system may include configurable components in the form of executable software programmed to function either as a consumer or producer. Consumers may be defined as components within the middleware system that are configured to receive messages from an external system such as the CIS or SCPMS. Consumers may be developed as session beans that retrieve, parse and store messages within the telecommunication network computer system. Producers may be defined as components within the middleware system that are configured to transmit messages out of the middleware messaging system.

As the SCPMS utilizes a point-to-point messaging system, the middleware messaging system may include dedicated producers and consumers for each application hosted on the SCPMS. In contrast, one producer and one consumer may send and receive messages from multiple applications within the CIS. That is, consumers and producers in communication with applications in the CIS do not have a one-to-one correspondence.

Instead, each consumer may communicate with all the producers in the middleware messaging system. As discussed below, in the context of addressing failover, the ability of a consumer to communicate with each of the producers may be beneficial to handling the failover. For example, a consumer may receive notification that an application has been moved to a different node; the consumer may communicate with the producer dedicated to sending messages to the application and notify the producer of the switchover.

The configurable components may be modified by way of a configuration file. In various embodiments, changes in a configuration file that are undeployed and redeployed may cause a number of producers and consumers to be adjusted per the configuration file. This change may be implemented without a restart of the middleware messaging system. More specifically, the consumers and producers may be dynamically changed through a combination of a configuration file and database entries. For example, new consumers and producers may be added by way of the configuration file, and similarly existing consumer and producers may be deleted by way of the configuration file. As consumers and producers communicating with the SCPMS have a one-to-one correspondence with respective applications hosted on the SCPMS, new consumers and producers may be added, for example, when a new application is brought up on the SCPMS. Similarly, if an application previously hosted on the SCPMS is no longer in use, the corresponding producer and consumer may be deleted.

Additionally, the discussed structure in the middleware messaging system provides enhanced failover. For example, in some embodiments, the middleware messaging system is additionally equipped to handle failover messages received from the SCPMS. The SCPMS may implement a failover mechanism in which a particular application may be hosted on one of two nodes, for example a primary node and a backup node. If the primary node fails, the SCPMS may initiate another instance of the application on the backup node. In such scenarios, the middleware messaging system may have individual consumers dedicated to listening to each of the nodes of the SCPMS. As implemented, during a failover operation, when a node is designated as the node to host a particular application, that respective node will transmit a message indicating that messages destined for the particular application should be transmitted to the node. Accordingly, a corresponding consumer listening for the signal will receive the message and subsequently the consumer may communicate information about the new node directly to the producer dedicated to transmitting messages for the particular application of the SCPMS.

Not only is the middleware messaging system equipped to transmit messages between external systems, such as the CIS and the SCPMS, the middleware messaging system may also handle messages between the CIS and applications internal to the telecommunications network computer system. In both the context of transmitting messages between external systems and transmitting messages between an external system and an internal system, the discussed structure of the middleware messaging system ties together messages from different messaging systems. In various embodiments, this may possibly entail transmitting messages between three different systems, for example the messaging systems may be different between the CIS, the SCPMS, and the telecommunication network computer system. Accordingly, a method may be implemented in the middleware messaging system in which a consumer may parse a received messaged and selectively deliver the message to either an application internal to the telecommunications network computer system or another external system. The middleware messaging system may selectively deliver messages based on header information contained in received messages as well as internal routing tables.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. Computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
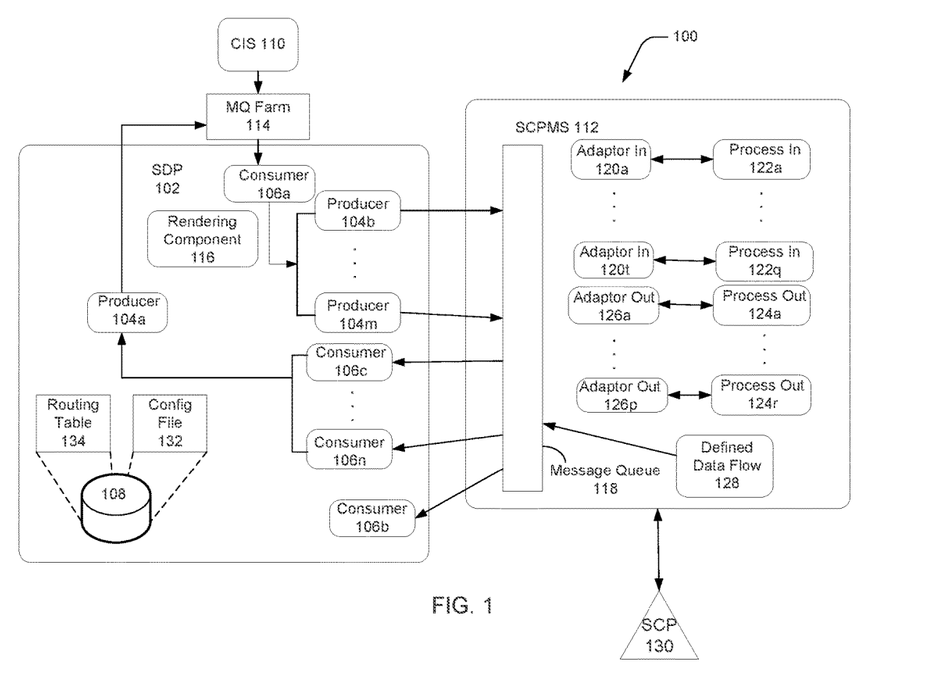
FIG. 1 is an illustration of a system according to an embodiment of the disclosure.

Turning now to FIG. 1, a system 100 is described. Embodiments of the system 100 can be practiced in a distributed computing environment, where multiple computing devices are communicatively interconnected through a network (e.g., local-area network (LAN) or a wide-area network (WAN) including the Internet). System 100 comprises components of a telecommunications network computer system including a service delivery platform 102 comprising a set of configurable components including a plurality of producers 104a, . . . , 104m and consumers 106a, . . . , 106n. The telecommunications network computer system may be owned and operated by a telecommunications network service provider.

The service delivery platform 102 also comprises a database 108 and a middleware messaging system may be comprised of consumers 106a, . . . , 106n and producers 104a, . . . , 104m. Service delivery platform 102 may be hosted on a single computer or across a network of computers and provides a service delivery architecture at least between a customer information system (CIS) 110 and a service control point management system (SCPMS) 112.

SCPMS 112 serves as an external data interface to a service control point (SCP) 130. SCPMS 112 may receive various messages from the telecommunication network service provider pertaining to a call setup and resolution of routing performed during the call setup. For example, the SCPMS 112 may support a toll free application in which a toll free number is established and configured in the telecommunication network as well as in SCP 130. SCPMS 112 may manage a plurality of SCPs 130 based on content SCPMS 112 receives from the telecommunication network service provider.

Continuing the discussion of the middleware messaging system, in various embodiments, consumers 106a, . . . , 106n may comprise executable software, such as a JAVA® session bean, that receives messages from systems external to SDP 102 such as CIS 110 or SCPMS 112. SDP 102 may receive information about customer orders or facilities to be used in the telecommunications network from CIS 110. In particular, consumer 106a within SDP 102 may receive messages from CIS 110 by way of a message queue (MQ) farm 114. The MQ farm 114 may be deployed as a platform that houses a plurality of different MQ queues for a plurality of applications. The MQ farm 114 may represent a centralized location at which the telecommunications network service provider has defined several MQ queues.

Messages from CIS 110 may be placed on one of several queues within the MQ farm 114. In various embodiments, the queues within MQ farm 114 do not define a final destination of a message. That is, consumer 106a does not determine a destination of a message based on a particular queue from which the message is retrieved. Instead, information stored in the header of the message correlates to a destination of the message. Unlike, a system implementing a queue-to-queue routing in which a message may reach its final destination by traveling through a series of queues, messages retrieved from MQ farm 114 may be placed on another queue or placed in database 108. Thus, the routing is dynamic rather than static.

Messages read from the MQ farm 114 may be destined for one of two locations including the SCPMS 112 or subsystems internal to the telecommunications network. Furthermore, the routing of a message within SDP 102 may be table driven and the messaging middleware system may determine where to place a retrieved message based partially on information stored in the header as well as a table within the middleware messaging system.

Consumer 106a may comprise executable software that, once executed, causes the consumer 106a to read messages from the MQ farm 114 and, based on a determined destination of the message, either place the message in database 108 or place it on another queue. If the message is destined for a subsystem of the telecommunications network, the consumer 106a may store the message in database 108 for subsystems to retrieve. If the message is destined for an application on the SCPMS 112, the consumer 106 may place the message on another queue for SCPMS 112 to retrieve. Thus, messages received from the MQ farm 114 may have different destinations, and the messages may be handled differently based on the destination of each message.

Upon retrieving a message from the MQ farm 114, consumer 106a may parse the header of the message to determine a destination of the message (e.g., SCPMS 112 or a subsystem internal to the telecommunications network). For messages destined for internal subsystems, consumer 106a may comprise executable software that once executed, causes the consumer 106a to parse the header of a message, store the header in a header table and the payload in a separate table based on information in the header of the message. The payload is stored in the separate table in a database such as database 108 without being parsed; instead the payload is maintained as a string of data. Basic validations may be performed prior to storing the data in the tables. Subsequently, applications within the subsystem may retrieve the payloads from the separate table in database 108.

Consumer 106a may also determine to place a message destined for an application on the SCPMS 112 based on header information of the message. In various embodiments, after determining a message is destined for an application on SCPMS 112, the consumer 106a may send the message to a producer such as one of producers 104b, . . . , 104m. In various embodiments, producers 104a, . . . , 104m may have an interface that enables consumers 106a, . . . , 106n to relay message buffers to the producers 104a, . . . , 104m. Rather than wait for a polling cycle to pick up a pending message, a messaging infrastructure, such as Enterprise JavaBeans (EJBs), may be implemented to relay messages between consumers 106a, . . . , 106n and producers 104a, . . . , 104m.

Consumer 106 may determine a route for a retrieved message based on an internal table. For example, a retrieved message may be destined for a particular application on the SCPMS 112. The SCPMS 112 may primarily utilize a point-to-point messaging system. In order to create a middleware messaging system that is compatible with the point-to-point messaging system, the producers 104b, . . . , 104m may be application specific. For example, producer 104b may correspond to an application A hosted on SCPMS 112. Thus, a single producer 104b may be dedicated to transmitting messages to a particular application hosted on SCPMS 112. Upon retrieval of a message from MQ farm 114, after determining that a message is destined for an application on SCPMS 112 based on header information and internal tables, consumer 106a may determine an appropriate route and queue to place the message on.

For example, for a message destined for application A, consumer 106a may determine to transmit the message to producer 104b, which corresponds to application A hosted on SCPMS 112. Subsequently the producer 104b may transmit the message to message queue 118 after which one MQ adaptor of the plurality of MQ adapters 120a, . . . , 120t may retrieve the message and send it to a corresponding application or process 122a, . . . , 122q. The SCPMS 112 may also have adaptors 126a, . . . , 126p which correspond to processes 124a, . . . , 124r.

In various embodiments, adaptors 126a, . . . , 126p provide an interface between message queue 118, which may utilize a message system based on a message queue messaging system and processes 122a, . . . , 122q and 124a, . . . , 124r, which may utilize a message system based on point-to-point messaging system. Thus adaptors 126a, . . . , 126p serve as mediators that may convert a message of a message queue messaging system to a message compatible with a point-to-point messaging system and vice versa.

By implementing a routing mechanism that is driven by information contained in message headers and internal tables, the middleware messaging system has the flexibility to deliver to two different types of destinations. When delivering to an internal subsystem, the middleware messaging system may avoid MQ protocols and overhead associated with delivering through an MQ queue by storing the payload of a message in database 108. Applications within the internal subsystems may retrieve message payloads from database 108. When delivering to an external system such as SCPMS 112, the middleware messaging system may place the message on an additional queue for transmission to SCPMS 112. Accordingly, the middleware messaging system may deliver messages to destinations that utilize different messaging systems.

Continuing the discussion of the configurable components of the middleware messaging system, in various embodiments, a single consumer 106a may directly communicate with all the producers 104a, . . . , 104m in the middleware messaging system. Additionally, although a single consumer 106a is shown communicatively coupled to the MQ farm 114, multiple consumers may be communicatively coupled to the MQ farm 114. Each of the multiple consumers may retrieve messages from the MQ farm 114, and each of the multiple consumers may individually communicate with all the producers 104a, . . . , 104m.

As discussed, consumers, such as consumer 106a may be configured to retrieve messages from MQ farm 114, parse the header of the retrieved messages and use information in the header and one or more internal routing tables 134 to route the message to one of two different types of destinations. In contrast, consumers such as consumers 106b, . . . , 106n may be configured to listen for messages incoming from respective applications or processes hosted on SCPMS 112. As the messaging system implemented on SCPMS 112 may utilize a point-to-point messaging system, a consumer such as consumers 106b, . . . , 106n may be configured to listen to messages coming from one application or process hosted on SCPMS 112. That is, each of the consumers 106b, . . . , 106n may be dedicated to an individual application or process hosted on SCPMS 112.

After receiving a message from SCPMS 112, consumer 106b, . . . , 106n may determine to transmit the message to MQ farm 114 (by way of producer 104a), to place the message in database 108 (also by way of a producer such as producer 104a), or to communicate with one or more of the producers 104a, . . . , 104m. Accordingly, each of the consumers 106a, . . . , 106n has the ability to communicate with each of the producers 104a, . . . , 104m. In various embodiments, routing table 134 may be located in database 108 or any other database accessible by the middleware message system.

The ability of a consumer to communicate with each producer in the messaging middleware system may be useful, for example, when a configuration changes in SCPMS 112. For example, an application or process may be moved to a different node of SCPMS 112. Accordingly, a consumer, such as consumer 106b may receive the notification of such a transfer and then communicate to the producer dedicated to communicating with the moved process. The consumer may communicate the change so the producer is updated on a location of the moved application, so the producer can continue sending messages to the moved application.

In various embodiments, a status of the configurable components comprising the consumers 106a, . . . , 106n and producers 104a, . . . , 104m may be managed by a configuration file 132 and table entries. In various embodiments, the configuration file 132 and table entries may be located in database 108. In other embodiments, the configuration file 132 and table entries may be located in separate databases, a database other than database 108, or in other memory of the middleware messaging system that is accessible by the application server. The use of configuration file 132 and table entries enables an operator to change the status of the configurable components on the fly and without having to deploy new code. For example, configuration file 132 and table entries may be used to define a new consumer or a new producer without deploying new code to create the new consumer or producer. The status of the configurable components may include a quantity of the consumers 106a, . . . , 106n and a quantity of the producers 104a, . . . , 104m that are actively deployed within the middleware messaging system. When a status is changed, consumers and producers may be added or deleted.

Continuing the discussion of configuration file 132, a change of the status of the configurable components is different from a publish-subscribe messaging system in which a message may be published to a topic. To implement the ability to change a status of the configurable components by configuration file 132, initially code may be compiled to create a code base in which one class is assigned to consumers and a different class is assigned to producers. The configuration file 132 then may be used to change the number of consumers and producers with the code base in which one class is assigned to consumer and a different class is assigned to producers. The configuration file 132 may have a Enterprise Application Archive (EAR) file format.

In order to make changes to configuration file 132, the configuration file may be undeployed by the application server, where the application server continues to run while the configuration file is undeployed. Changes may be made to configuration file 132 including deleting entries or adding entries to change a status of the configuration components, and subsequently the configuration file may be redeployed. Thus, changes to the status of the configurable components may be made without shutting down the application server to implement the changes.

Changes made dynamically to the configurable components may be made not only by a configuration file, but also by table entries in a database and as discussed below, a management web page. The different methods may dynamically change a status of the configurable components without requiring a restart of the middleware messaging system. In contrast, current approaches may require a reboot or restart of the system in order for any changes made to the configurable components to take effect.

In various embodiments, the status of the configurable components may be changed by way of a web-based control interface including a graphical user interface (GUI). That is, a set of configurable components to deploy may be dynamically changed by a configuration file and corresponding database entries. Deployed components may then be monitored and controlled via a GUI. The control interface may be rendered by rendering component 116. Rendering component 116 may retrieve information from a naming directory such as Java Naming and Directory Interface (JNDI) to discover the producers and consumers that are defined in configuration file 132 to render a status of the configurable components. In various embodiments, entries may be stopped or started by way of the GUI which in turn modifies the run state of consumers or producers in the middleware messaging system.

During a change of the status of the configuration components, consumers and producers may be created in pairs. For example, if an operator wishes to deploy a consumer for a new application hosted on SCPMS 112, a corresponding producer may also be created so messages can be both received and transmitted to the new application.

The middleware messaging system may also support failover mechanisms implemented by SCPMS 112. In an embodiment, SCPMS 112 may comprise at least two nodes from which applications may be hosted. One of the two nodes is the active node for any particular application. When one node ceases to host a particular application and the other node hosts an instance of the particular application, SCPMS 112 may transmit a message with information regarding the failover by way of defined data flow component 128. SDP 102 has a consumer 106b that is dedicated to listening for messages from defined data flow component 128 from a particular node of the SCPMS 112. Additional details of consumer 106b listening for messages from defined data flow component 128 are discussed below with regards to FIG. 2.

Figure 2:
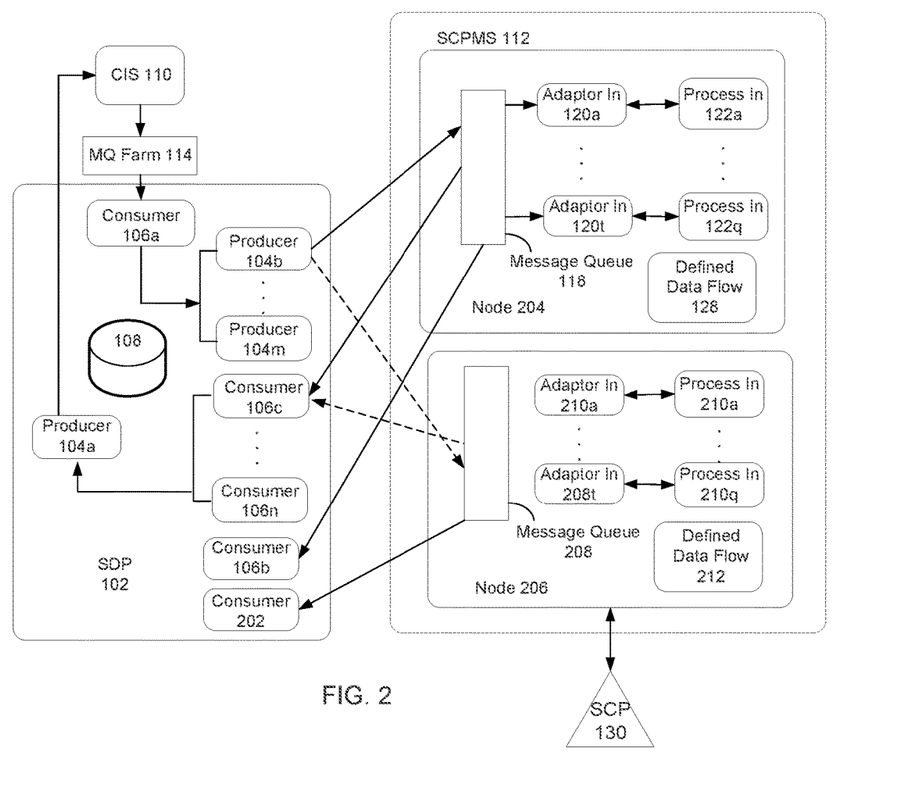
FIG. 2 is an illustration of an additional system according to an embodiment of the disclosure.

Turning now to FIG. 2, the failover mechanism is discussed in further detail. Two nodes 204 and 206 of SCPMS 112 are shown which may host various applications or processes 122a, ..., 122q and 210a, ..., 210q respectively. In various embodiments, node 204 may be physically present at a different geographical location than node 206. Node 206 has the ability to host the same applications as node 204, and node 206 may serve as a backup node for node 204 in the event that node 204 fails or node 204 is taken offline to perform upgrades, maintenance, etc. Similarly node 204 may serve as a backup node for node 206. Thus, at any given time, one or the other node 204 and 206 may be the node dedicated to hosting a particular application.

For example, at a given time, process 122a may be hosted on node 204. For a variety of reasons, SCPMS 112 may move process 122a to node 206 and cease operating process 122a on node 204. Accordingly, an instance of process 122a may be started as process 210a on node 206. Thus processes 122a and 210a, in this example, are the instances of the same application. Defined data flow component 212 of node 206 may transmit a message to the messaging middleware system indicating that node 206 is the active node for any messages that are trying to reach process 210a (formerly process 122a on node 204).

The middleware messaging system may receive the message by way of consumer 202. Each node of SCPMS 112 may have a dedicated consumer listening for a message from the respective node indicating applications that are active on the node; the dedicated consumers are listening on both the active and non-active node for transmissions sent to the middleware messaging system. Thus, when node 206 activates process 210a, node 206 will transmit a message indicating that node 206 is the active node for process 210a. Upon receipt of the failover message, consumer 202 may communicate to the producer designated to sending messages to process 122a to now transmit messages destined for process 122a to process 210a hosted on node 206.

In various embodiments, the middleware messaging system may have the ability to determine messages pending a response from process 122a and retransmit those messages to the instance on the application running on the new or backup node 206. In some scenarios, messages may have been transmitted to process 122a for which the middleware messaging system is waiting to hear confirmation of receipt or otherwise from the process 122a. Once the new instance of the application begins running as process 210a on node 206, the designated producer may check a queue or list of messages that had previously been transmitted to process 122a on node 204 without a response and transmit those messages to process 210a on node 206. This may reduce the number of messages that might be otherwise lost during the switchover between application instances on different nodes. Continuing the example, the middleware messaging system may also release a connection to node 204 for process 122a, as node 204 is no longer the active node for transmitting messages to the process 122a.

Figure 3:
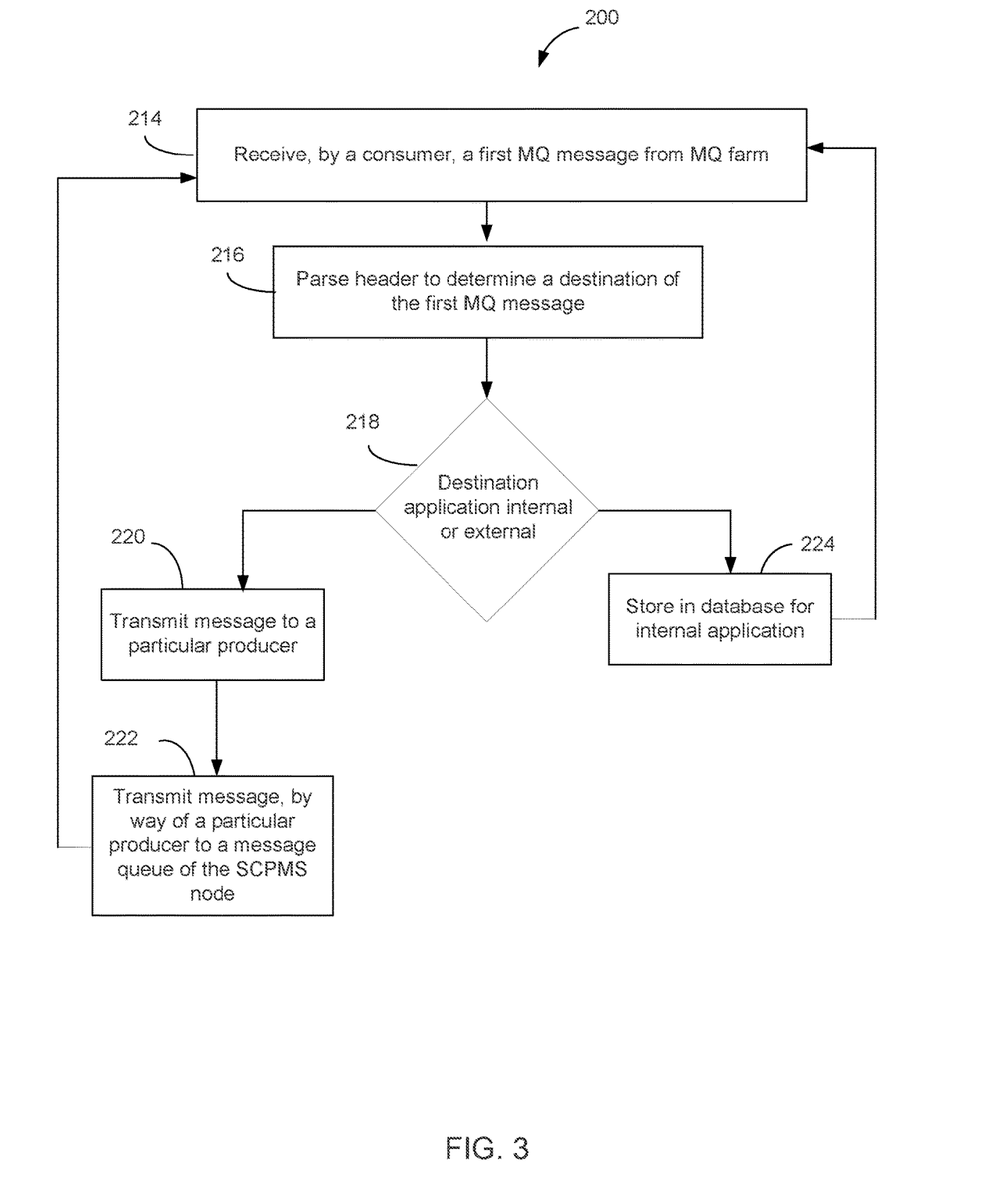
FIG. 3 is a flow chart illustrating a method according to an embodiment of the disclosure.

Turning now to FIG. 3, a method 200 is described. The method describes a middleware messaging system processing a received message. In various embodiments, some of the blocks shown in FIG. 3 may be performed concurrently, in a different order than shown, or omitted. Additional method elements may be performed as desired.

At block 214, a consumer of the middleware messaging system receives a first MQ message from an MQ farm. At block 216, the consumer parses the header to determine a destination of the first MQ message. At decision block 218, a determination is made, based on header information and internal routing tables, whether a destination of the message is an internal application (destined for subsystems of the telecommunications network) or an application external to the telecommunications network.

If the destination of the message is for an application that is external to the telecommunications network, the flow proceeds along the left side to block 220. At block 220, the message is transmitted to a particular producer. The producer may be specific to the final application external to the telecommunications network. For example, the producer may be dedicated to only transmitting messages to one application hosted in the external system, such as SCPMS 112. Accordingly, at block 222, a particular producer may transmit the message to an message queue of the external system, such as SCPMS 112.

If the destination of the message is for an application that is internal to the telecommunications network, the flow proceeds along the right side to block 224. At block 224, the message payload may be stored in a database, such as database 108. Applications internal to the telecommunications network may access the message payloads from the database 108.

Figure 4:
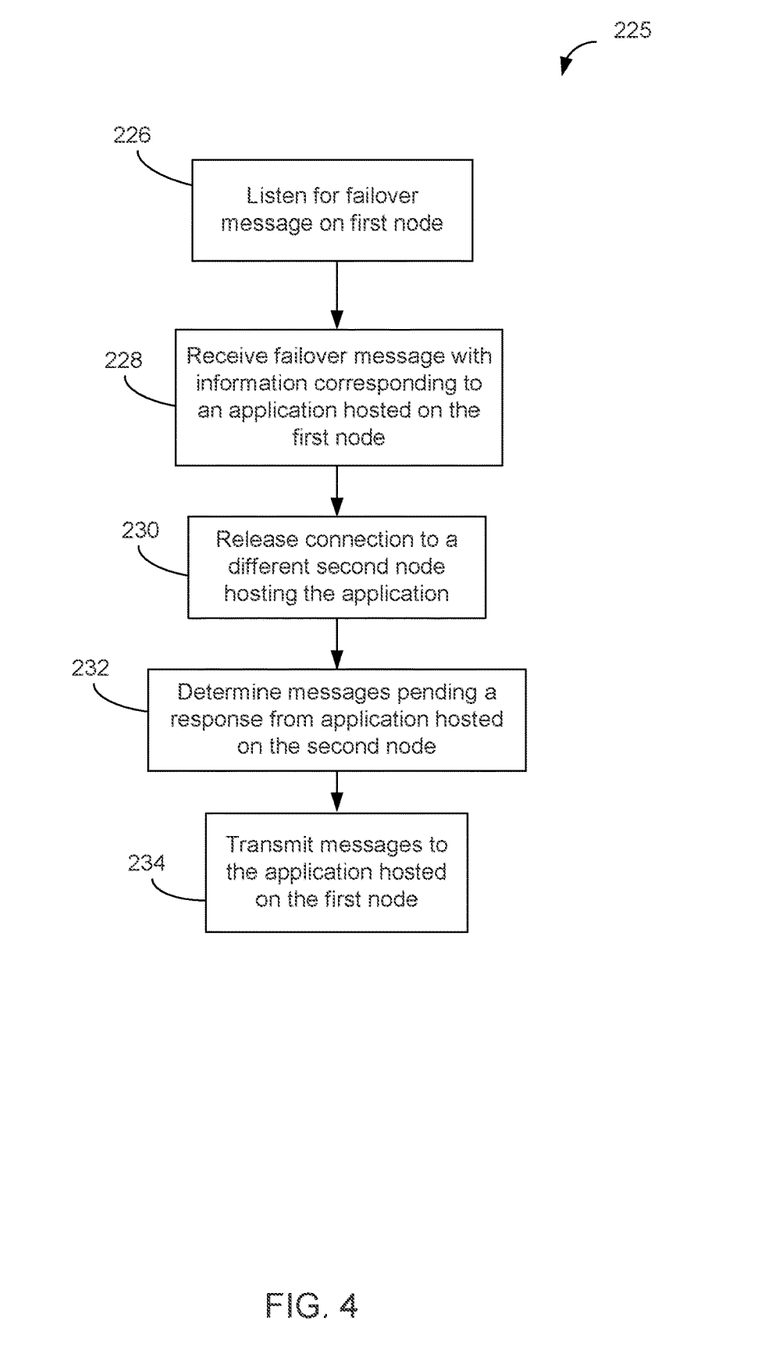
FIG. 4 is a flow chart illustrating a method according to an embodiment of the disclosure.

Turning now to FIG. 4, a method 225 of handling a failover process is discussed. In various embodiments, some of the blocks shown in FIG. 4 may be performed concurrently, in a different order than shown, or omitted. Additional method elements may be performed as desired.

At block 226 a consumer of the middleware messaging system listens for a failover message on a first node of the SCPMS. At block 228, the consumer receives a failover message with information corresponding to an application on the first node. The information may indicate that the first node is now the active node for messages directed to the application.

At block 230, the middleware messaging system, by way of the producer, may release a connection to a different second node hosting the application. The second node may have hosted a prior instance of the application that is no longer active. At block 232, the producer may determine messages pending a response from the application that was previously hosted on the second node. The message may have been sent prior to the switchover, and the middleware messaging system may determine that no response had been received from the application on the second node after transmission of particular messages.

The middleware messaging system may determine messages pending a response from the application hosted on the second node based on a list of messages that were sent. At block 234, messages pending a response from the application hosted on the second node are transmitted to the application hosted on the first node. This ability reduces a possibility of losing messages during the switchover between the application being hosted on the second node to being hosted on the first node.

Figure 5:
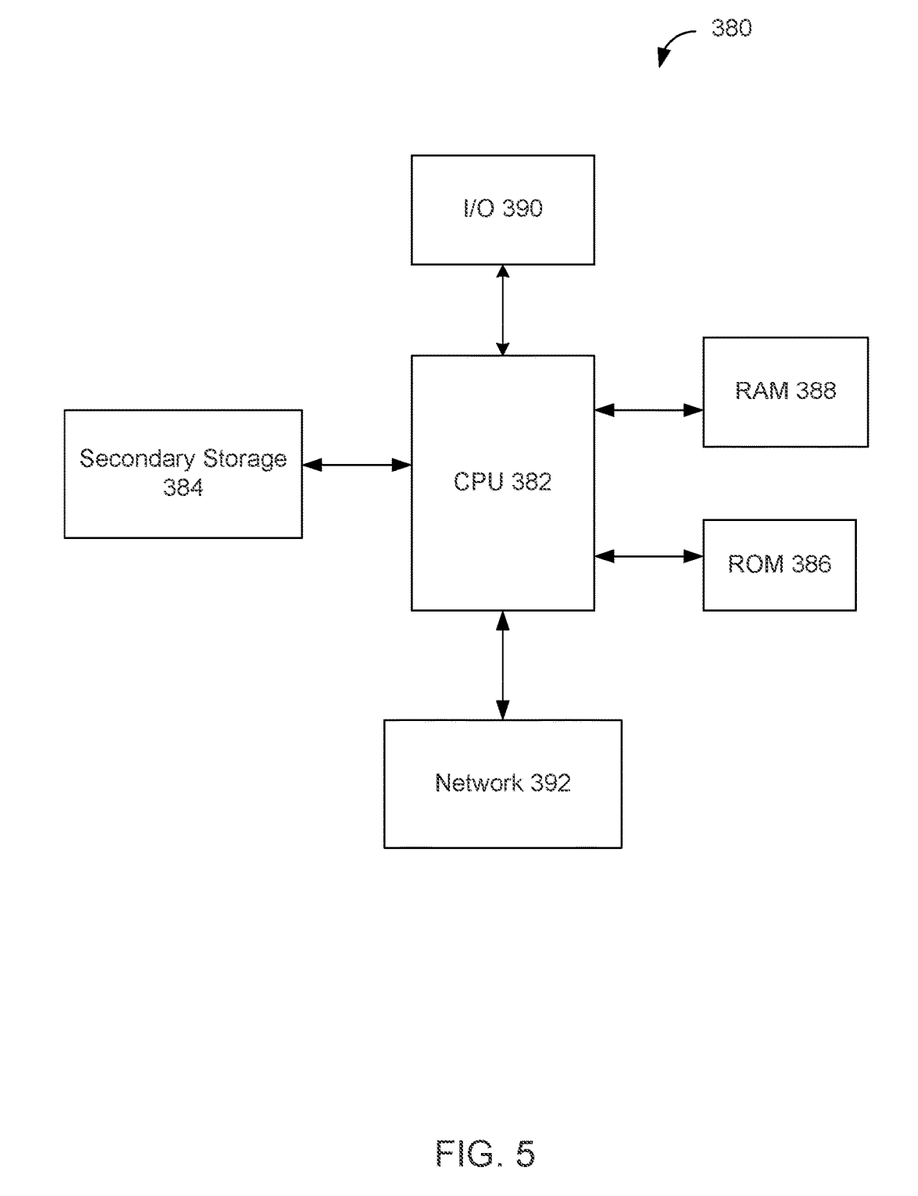
FIG. 5 is a block diagram illustrating an exemplary computer system suitable for implementing various aspects of an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A middleware messaging system hosted on a telecommunications network computer system configured to route messages between a message queue (MQ) messaging system of a customer information system (CIS) and a point-to-point messaging system of a service control point management system (SCPMS), the middleware messaging system comprising:
   a routing table; and
   a non-transitory memory storing processor-executable software instructions for forming configurable components for a plurality of service delivery platform (SDP) consumers and a plurality of SDP producers, wherein a status of the configurable components is dynamically changed by at least one of: a configuration file, table entries in a database, or a management web page;
   wherein the status is dynamically changed without a restart of the middleware messaging system;
   wherein an SDP consumer communicatively couples an MQ farm and a set of SDP producers of the plurality of SDP producers;
   wherein the middleware messaging system is configured to:
      transmit, by way of the configurable components, messages between the CIS and SCPMS, wherein a first instance of a telecommunication application is hosted on a first node of the SCPMS, the SCPMS further comprising a backup node;
      receive, by an SDP producer corresponding to the backup node, a failover message from the backup node indicating a second instance of the telecommunication application is hosted on the backup node;
      determine messages pending a response from the first instance of the telecommunication application hosted on the first node;
      transmit the messages to the second instance of the telecommunication application;
      release a connection to the first instance of the telecommunication application hosted on the first node; and
      parse messages retrieved, by the SDP consumer, from the MQ farm, and selectively deliver messages to a destination comprising one of: an MQ queue of the SCPMS or an internal database on the telecommunications network computer system, based on the parsing of the message and the routing table, by:
         retrieving, by the SDP consumer, a first message from the MQ farm, the first message comprising identifier information;
         identifying, by the SDP consumer, a route of the first message based on the identifier information and the routing table; and
         transmitting the message, based on the identified route, to one of the MQ queue or the internal database.

2. The middleware messaging system of claim 1,
   wherein an SDP consumer of the SDP consumers is configured to listen for a failover message from the backup node; and
   wherein a different SDP consumer of the SDP consumers is configured to listen for a failover message from the first node.

3. The middleware messaging system of claim 1,
   wherein the status of the configurable components comprises a quantity of the plurality of SDP consumers and a quantity of the plurality of SDP producers.

4. The middleware messaging system of claim 1, further comprising:
   an internal database, wherein the internal database stores payloads of messages destined for telecommunication applications hosted internal to the telecommunications network computer system, and
   wherein the telecommunication applications are configured to access the internal database to retrieve the payloads.

5. The middleware messaging system of claim 1, further configured to:
   render the management web page,
   wherein the management web page displays a state of the configurable components,
   wherein the management web page further enables a user to dynamically change a run state of at least one of the plurality of SDP producers and the SDP consumers.

6. The middleware messaging system of claim 5, wherein dynamically change a run state of at least one of the plurality of SDP producers and the SDP consumers further comprises:
   retrieving information from a naming directory; and
   discovering SDP producers and SDP consumers that are defined in the configuration file.

7. The middleware messaging system of claim 1,
   wherein a respective SDP consumer is in communication with each of the plurality of SDP producers; and
   wherein a respective SDP producer is in communication with each of the plurality of SDP consumers.

8. A service delivery platform (SDP) defined within a telecommunication network computer system that provides a new interface while maintaining backwards compatibility with an external telecommunication network platform comprising:
   a first node and a second node each configured to host multiple telecommunication applications, the second node serving as a backup to the first node, the SDP comprising:
   a message database; and
   a middleware messaging system, the middleware messaging system comprising configurable components comprising executable software for a plurality of SDP consumers and a plurality of SDP producers, the configurable components communicatively coupling a message queue (MQ) farm and an MQ queue of the external telecommunication network platform,
   the middleware messaging system configured to
      parse messages retrieved from the MQ farm and to selectively deliver messages to a destination comprising one of: the MQ queue or a table inside the message database, based on the parsing of the messages, wherein selectively delivering the messages further comprises:

retrieving, by an SDP consumer, a first message from the MQ farm, the first message comprising identifier information;

identifying, by the SDP consumer, a route of the first message based on the identifier information and a routing table stored in the middleware messaging system;

transmitting the message, based on the identified route, to one of the MQ queue or the table inside the message database;

receiving, via a first SDP consumer of the plurality of SDP consumers, a first failover message from the first node by way of the MQ queue, and a second SDP consumer of the plurality of SDP consumers is configured to receive a second failover message from the second node by way of the MQ queue, the second failover message comprising information indicating that the second node is the active node for a particular telecommunication application hosted on the external telecommunication network platform; and in response to the second failover message, connecting respective configurable components corresponding to the instance of the particular telecommunication application to the second node and releasing a connection between the first node and the respective configurable components corresponding to a different instance of the particular telecommunication application.

9. The system of claim 8, wherein a respective SDP consumer is in communication with each of the plurality of SDP producers; and wherein a respective SDP producer is in communication with each of the plurality of SDP consumers.

10. The system of claim 8, further configured to render a management web page, wherein the management web page displays a state of the configurable components of the SDP, wherein the state comprises a quantity of SDP consumers and a quantity of SDP consumers.

11. The system of claim 10, wherein the management web page further enables a user to dynamically change a run state of at least one of the SDP consumers or the SDP producers.

12. The system of claim 8, wherein each of the configurable components including the SDP consumers and the SDP producers is defined in a configuration file stored in the SDP and wherein an additional configurable component is added by way of the configuration file.

13. The system of claim 8, wherein, in response to the second failover message, the respective configurable components are configured to:

check a database table to determine messages pending a response from the different instance of the particular telecommunication application hosted on the first node; and transmit the messages to instance of the particular telecommunication application hosted on the second node.

14. A method of brokering messages between a message queue system of a customer information system (CIS) and a point-to-point messaging system of a service control point management system (SCPMS) comprising:

on a service delivery platform (SDP):

dynamically creating service delivery platform (SDP) consumers by way of a configuration file without restarting a system managing the SDP consumers;

dynamically creating SDP producers by way of the configuration file without restarting the system managing the SDP consumers, the SDP consumers and SDP producers comprising executable software;

receiving, by an SDP consumer of the SDP consumers, a message in message queue (MQ) format from the CIS;

determining, by the SDP consumer, a destination application based on header information in the message and based on a routing table;

transmitting messages between the CIS and SCPMS, wherein a first instance of a telecommunication application is hosted on a first node of the SCPMS, the SCPMS further comprising a backup node;

receiving, by an SDP producer corresponding to the backup node, a failover message from the backup node indicating a second instance of the telecommunication application is hosted on the backup node;

determining messages pending a response from the first instance of the telecommunication application hosted on the first node;

transmitting the messages to the second instance of the telecommunication application;

releasing a connection to the first instance of the telecommunication application hosted on the first node; and parsing messages retrieved, by the SDP consumer, from a MQ farm, and selectively delivering messages to a destination comprising one of: an MQ queue of the SCPMS or a database located on the SDP, based on the parsing of the message and the routing table, by:

retrieving, by the SDP consumer, a first message from the MQ farm, the first message comprising identifier information;

identifying, by the SDP consumer, a route of the first message based on the identifier information and the routing table; and transmitting the message, based on the identified route, to one of the MQ queue or the database.

15. The method of claim 14, wherein a location of the destination application is on the SDP and the message is transmitted to the database located on the SDP.

16. The method of claim 14, wherein a location of the destination application is on the SCPMS and the message is transmitted to the SCPMS in an MQ format by way of an SDP producer of the SDP producers, the SDP producer corresponding to the destination application on the SCPMS, and wherein the message is further transmitted from the SDP producer to an MQ queue on the SCPMS.

\* \* \* \* \*